(12) United States Patent
Mehra et al.

(10) Patent No.: US 11,704,996 B2
(45) Date of Patent: Jul. 18, 2023

(54) ADAPTIVE VARACTOR BASED FLEXIBLE MATCHING NETWORK TO SUPPORT MULTIPLE IMPLANT CONDITIONS

(71) Applicant: Medtronic, Inc., Minneapolis, MN (US)

(72) Inventors: Ashutosh Mehra, Minneapolis, MN (US); Trevor D. Webster, Washington, DC (US)

(73) Assignee: Medtronic, Inc., Minneapolis, MN (US)

( * ) Notice: Subject to any disclaimer, the term of this patent is extended or adjusted under 35 U.S.C. 154(b) by 98 days.

(21) Appl. No.: 17/237,288

(22) Filed: Apr. 22, 2021

(65) Prior Publication Data
US 2021/0335126 A1    Oct. 28, 2021

Related U.S. Application Data

(60) Provisional application No. 63/013,885, filed on Apr. 22, 2020.

(51) Int. Cl.
*G08C 17/02* (2006.01)
*H04B 1/3827* (2015.01)

(52) U.S. Cl.
CPC ............. *G08C 17/02* (2013.01); *H04B 1/385* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,409,245 | B1* | 8/2008 | Larson | H04B 1/18 343/860 |
| 8,634,928 | B1* | 1/2014 | O'Driscoll | A61N 1/37229 607/33 |
| 9,744,368 | B2* | 8/2017 | Dinsmoor | H02J 50/12 |
| 2002/0053953 | A1* | 5/2002 | Edmonson | H03H 9/0274 333/17.3 |
| 2010/0030304 | A1* | 2/2010 | Haubrich | A61N 1/37223 607/60 |
| 2010/0168817 | A1* | 7/2010 | Yamamoto | A61N 1/37229 607/60 |
| 2012/0206243 | A1* | 8/2012 | Butler | H04B 5/0062 340/10.51 |
| 2012/0235634 | A1* | 9/2012 | Hall | H02J 50/70 320/108 |
| 2013/0021220 | A1* | 1/2013 | Bair | H01Q 1/50 343/861 |
| 2014/0071015 | A1* | 3/2014 | Zheng | A61N 1/37252 343/860 |
| 2014/0203823 | A1* | 7/2014 | Joshi | A61N 1/37223 324/654 |
| 2015/0032052 | A1* | 1/2015 | Guardiani | H02J 50/27 607/59 |
| 2015/0324681 | A1* | 11/2015 | Mats | G06K 19/07766 235/492 |
| 2016/0048712 | A1* | 2/2016 | Butler | G06K 7/10198 340/10.51 |
| 2018/0316094 | A1* | 11/2018 | Hong | H01Q 15/14 |
| 2021/0085987 | A1 | 3/2021 | Fried et al. | |
| 2021/0106281 | A1* | 4/2021 | Tran | A61B 5/486 |
| 2021/0335126 | A1* | 10/2021 | Mehra | G08C 17/02 |

* cited by examiner

*Primary Examiner* — An T Nguyen
(74) *Attorney, Agent, or Firm* — Patterson Thuente IP (57) ABSTRACT

Impedance matching in tunable circuits promotes consistent, high-efficiency wireless communication signal despite changing environmental conditions.

14 Claims, 5 Drawing Sheets

ADAPTIVE VARACTOR BASED FLEXIBLE MATCHING NETWORK TO SUPPORT MULTIPLE IMPLANT CONDITIONS

CROSS-REFERENCE TO RELATED APPLICATIONS

The present application claims the benefit of U.S. Provisional Application No. 63/013,885 filed Apr. 22, 2020, which is incorporated herein in its entirety by reference.

FIELD

The present technology is generally related to communication and telemetry, such as for wirelessly rechargeable devices and primary cell implantable devices.

BACKGROUND

Devices used in medical, home, and consumer devices are more often expected to communicate wirelessly with other devices, hubs, or the internet. These wireless communications typically take place in high-frequency bands using communications which are proprietary, or standard protocols such as WiFi, Bluetooth, or Zigbee, among others. In one example, rechargeable and implantable medical devices use wireless signals to communicate a charge level, and rate of recharge, temperatures of operation, device identification information, or other data that can be usable in a wireless recharge session, in addition to the programming of the device and therapy, setting of stimulation parameters, streaming patient information and other data logs.

The frequencies used by wireless communication protocols can be in the kilohertz (kHz), megahertz (MHz), or gigahertz (GHz) ranges. The band most often used for communications of this kind is referred to as the Radio Frequency (RF) band, which is between about 20 kHz and about 300 GHz. Various types of devices can use different bands within this broader range. Preferred frequency ranges could be about 2.4 GHz or about 400 MHz to use known communication protocols.

Figure 1:
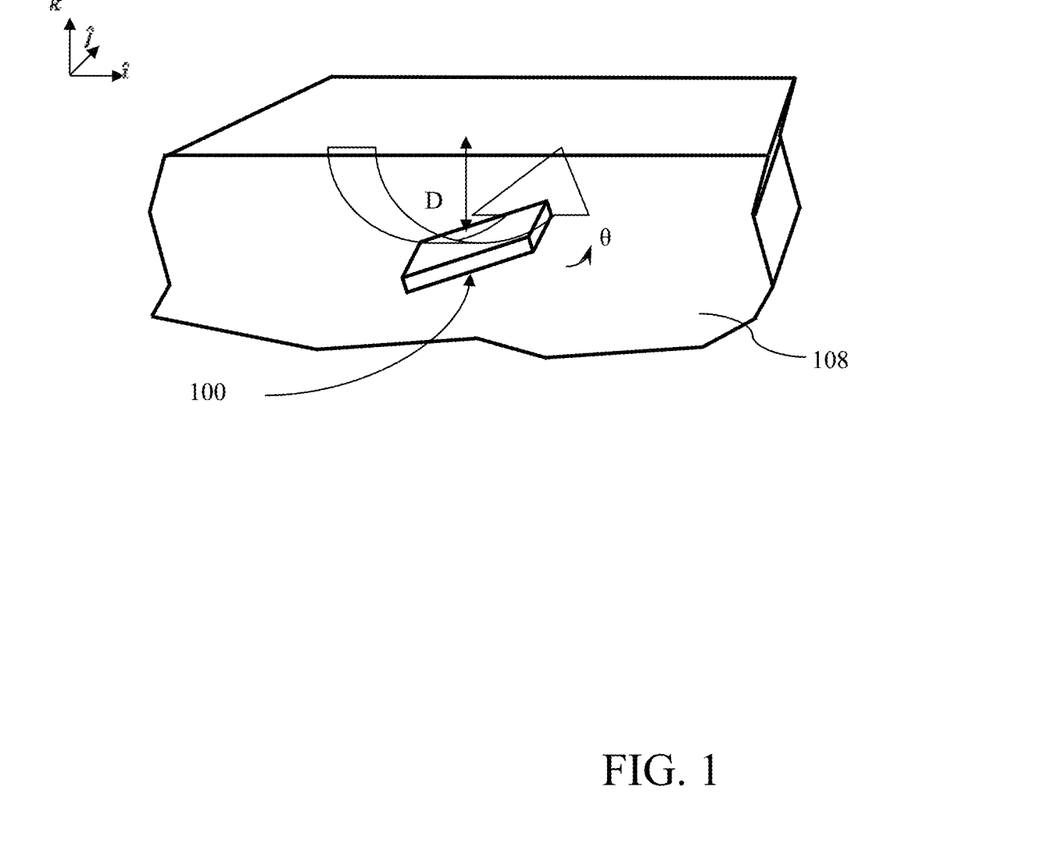
FIG. 1 is a cutaway perspective view of a device that can communicate wirelessly and is in a surrounding medium.

FIG. 1 depicts a simplified, rectilinear implantable device 100. Depending upon the position of the implantable device in the tissue and tissue properties, the RF antenna characteristics—impedance, efficiency, and gain—can vary.

The device 100 can be implanted in a patient's body 108 at a depth D, at an angle θ away from perfectly parallel to the skin. The angle θ and the net displacement of the device over time, from the skin surface as well as neighboring tissues, can impact the electromagnetic field components in any of the i, j, or k directions indicated by the coordinates in the drawing, and thus affect the overall antenna characteristics.

The received RF field may become less effective or even completely ineffective for communication to the device 100 over time, due to both change in position or orientation and also due to changes in the impedance of the RF antenna. Impedance matching is the practice of accommodating impedances at an interface in a circuit to increase power transfer by reducing signal reflection. This enables the RF antenna—which translates conducted electromagnetic energy into RF fields which propagate through space—to maximize power transfer to the device. If the interface between the RF antenna and the rest of the device remains un-matched, energy received by the antenna is reflected at this interface and lost within the antenna instead of being transferred to the rest of the device. This rule of impedance matching works in the other way as well, energy is sent by the rest of the device to the RF antenna for transmit. If the interface between the RF antenna and the rest of the device remains un-matched, energy gets reflected back into the device at the interface, resulting in energy loss and possible circuit damage.

One field in which wireless communication is becoming increasingly important is in implantable medical devices. Implanted medical devices have telemetry data requirements, including but not restricted to programming information, patient data streaming, therapy modifications, battery status. With the rigor required in the communication of said data, all possible methods to increase data transfer efficacy should be explored. Implanted RF antennas are deeply impacted for key performance parameters when loaded by the tissue, that results in reduced telemetry range performance. Impedance matching is critical to ensure maximum power transfer between the RF antenna and the rest of the device, in turn ensuring that no power is lost. This is important in an already power starved radio link. Not only are the antenna performance parameters limited, the human body is very lossy at higher RF frequencies.

Communication enables almost all features of rechargeable devices including transmission of charge level, and rate of recharge, temperatures of operation, device identification information, or other data that can be usable in a wireless recharge session, in addition to the programming of the device and therapy, setting of stimulation parameters, streaming patient information and other data logs, among others.

Changes in the environmental conditions, particularly changes in orientation or proximity to metal objects, result in changes on the loading of a antenna that is in use by an implanted device to emit the communications and telemetry data. When metal objects, such as external device coils or implanted leads, are present in proximity to the implanted device, the loading can be drastically affected by movement of the metal objects, impacting antenna parameters.

SUMMARY

The techniques of this disclosure generally relate to a tunable circuit having a current generator configured to produce an alternating electrical current; an antenna configured to receive the alternating electrical current and produce an alternating electromagnetic field; a plurality of fixed impedances arranged between the antenna and the current generator; and a variable impedance arranged in parallel/series with the plurality of fixed impedances and capable of being operated to maintain a matching impedance in combination with the plurality of fixed impedances.

In another aspect, the disclosure provides a method comprising setting a varactor impedance in a tunable circuit. The tunable circuit includes a current generator configured to produce an alternating electrical current; an antenna configured to receive the alternating electrical current and produce an alternating electromagnetic field; a plurality of fixed impedances arranged between the antenna and the current generator; and a variable impedance arranged in parallel/series with the plurality of fixed impedances and capable of being operated to maintain a matching impedance in combination with the plurality of fixed impedances. The method further includes detecting a receive signal strength indicator corresponding to the level of impedance matching between the plurality of fixed impedances and the variable impedance; and adjusting the variable impedance based upon the detected receive signal strength indicator.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Embodiments herein include circuitry and electronics that maintain good pairing between emitter and receiver of a communications or telemetry system. In some contexts, the good pairing between emitter and receiver can be used to promote fast, efficient wireless charging or recharging, or to transfer other patient data, status of an implanted medical device, or other information, whether static or dynamic.

As described in commonly-owned U.S. Provisional Patent Application No. 62/905,822, the contents of which are incorporated herein by reference in their entirety, field strength, size, and orientation can be adjusted to correspond to shifting position of an implanted medical device. These changes can be implemented based upon data communicated by systems as described herein.

As further described in commonly-owned U.S. Pat. No. 9,744,368 to Dinsmoor, the contents of which are also incorporated herein by reference in their entirety, external devices can self-tune to account for resonant frequency changes to maintain charging efficiency.

While these previous disclosures solve problems related to pairing between charging and recharging coils, pairing between antenna and receiver for communications often requires different solutions due to the different wavelengths used for communications and the bandwidth of communications signals, for example.

To solve these problems, a varactor is used as described throughout this disclosure to form a flexible matching network of a communications system. The use of a varactor-based flexible matching network reduces matching losses in the form of reflected, unusable power resulting from mismatch in impedances at RF energy exchange interfaces. The improvements in impedance matching can be implemented by using the varactor to algorithmically adjust RF communications performance across different load conditions (implant depth, tissue properties, proximity to metal etc.) experienced by a primary cell or wirelessly recharged device that can serve in multiple different conditions and for multiple different devices.

In particular in the context of medical devices, this adjustability of RF performance makes the overall communications system more versatile. Due to anatomical differences of implant locations, an implantable device is subjected to different loading conditions based on its location of use and even as a function of time at the same location. These changes can be due to movement of the device itself, or it can be due to the surrounding environment (e.g., a muscle is more conductive than fat, and therefore field will travel differently through each).

Operating frequency of a communications system can be chosen based upon a number of factors for different types of devices and environments. For example, the communications frequency that is chosen for a particular application may be one that is (1) not already crowded with other signals or noise; (2) within a band that is not absorbed by the surrounding environment; (3) suitable for the distance that the signal is intended to travel. The systems and methods described herein are not limited to medical devices, but an implantable or implanted medical device can be used to illustrate each of these criteria.

First, to avoid operating a communications system in a frequency band that is already crowded with other signals or noise, an implantable medical device may be designed or programmed to operate at a frequency that is not the same as other sources of signal that are expected to be found in the vicinity of the device once implanted. For example, since charging of implanted medical devices typically occurs around 150 kHz, communications data would not typically be transmitted in that range.

Second, the operating frequency of an implantable medical device typically takes into account the absorption spectrum of expected surrounding materials such as the body, air, and clothing, device casing or holders, and other materials that could reasonably be expected to be found between the receiver and emitter antennas/coils. As described above, wireless recharging typically takes place around 150 kHz, precisely because this is a frequency band in which the human body is nearly transparent to electromagnetic signal—a wireless communication frequency band may also be chosen that is likewise transparent (or nearly so).

Finally, the expected distance between the device and recharger can affect the available frequency bands. When the coils used in communications are expected to be relatively close to one another, near field communications can be used that would not be detectable at longer distances.

Table 1, below, illustrates the changes in impedance that can occur as a result of implant location for a medical device using a far-field communications protocol, by way of example, at two edges of a typical communications protocol frequency range (2.4 GHz and 2.48 GHz). Each of these impedances shows both real and imaginary components of impedance for an implanted device that is similar to other implanted devices commercially available from the applicant, Medtronic. The difference between 2.4 and 2.48 GHz can make a significant difference on the impedance of the overall communications circuit (and, accordingly, the total amount of signal power lost before reaching the antenna of a system).

| Implant Conditions | 2.4 GHz | 2.48 GHz |
| --- | --- | --- |
| Buttock (next to muscle) | 90 + j23 | 87 + j2 |
| Buttock (in fat) | 112 + j81 | 152 + j51 |
| Cranial | 95 + j59 | 116 + j34 |

Figure 2:
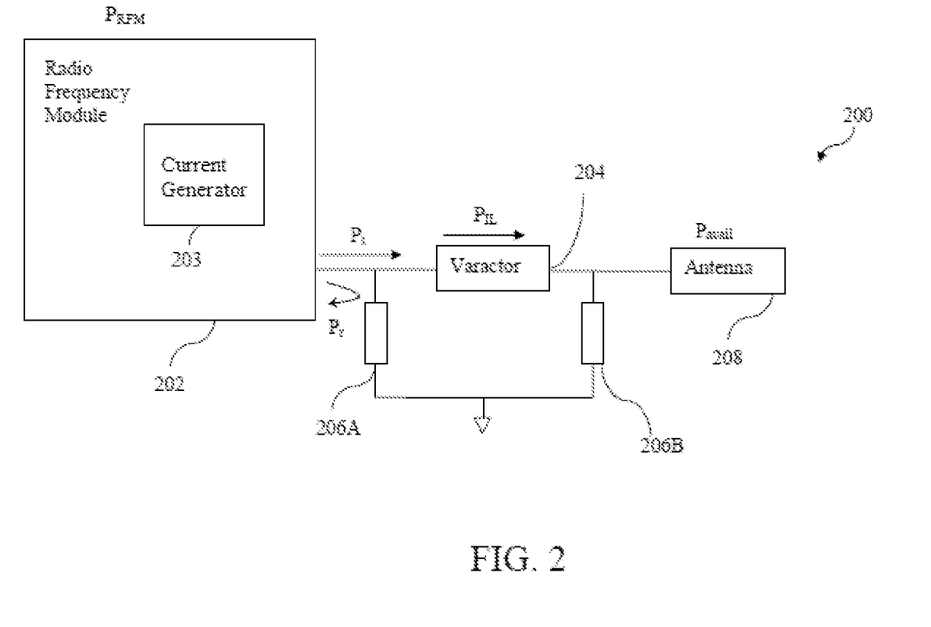
FIG. 2 is a circuit diagram of a tunable circuit according to an embodiment.

An impedance matching circuit is shown in FIG. 2. In this circuit 200, to reduce the signal reflection, the load input impedance for a wireless communications circuit is ideally the same as the source output impedance. Matching in this way reduces the power lost throughout the emitter circuit 200, in which power transmitted is reduced by reflection and insertion losses:

$$P_{avail} = P_{RFM} - P_r - P_{IL}$$

$P_{avail}$ is power that makes it from the source 202 past the impedance matching network (which includes varactor 204 and impedances 206A and 206B) to the antenna 208. Along the way, power is either reflected (as indicated by the arrow $P_r$) or transmitted (as indicated by the arrow $P_t$), and there is also insertion loss (as indicated by the arrow $P_{IL}$).

FIG. 2 shows the varactor 204 arranged directly between radio frequency module 202 including a current generator 203, and antenna 208, while fixed impedances 206A and 206B are arranged in a parallel path therebetween. It should be understood, however, that a varactor (or other variable-impedance device) could be arranged in series, in parallel, or in several positions in the circuit shown in FIG. 2 in order to provide appropriate impedance matching for a corresponding device with an antenna emitting a time-varying signal or in a dynamic environment where the receiver can move or ambient conditions may change impedance as a function of time.

Figure 3:
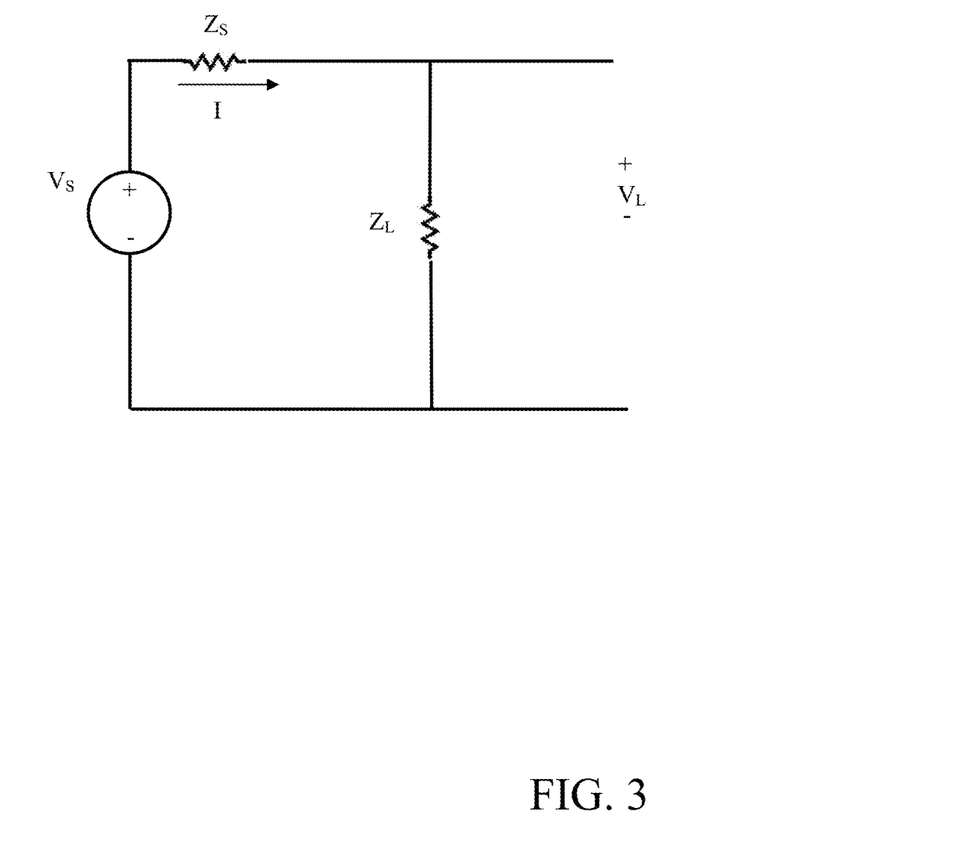
FIG. 3 is a simplified circuit diagram of impedance matching according to an embodiment.

A generic impedance matching circuit is shown in FIG. 3. A voltage source $V_S$ provides power that is delivered to impedance sources $Z_S$ and $Z_L$. The impedance is discontinuous, and the reflection coefficient can be defined as:

$$\Gamma = \frac{Z_L - Z_S}{Z_L + Z_S}$$

The return loss of a system, RL, can be defined as $$RL = 20 \log(\Gamma)$$

having units of dB. In general, the lower the return loss RL, the better, with values of less than 20 being preferable, and less than 13 being even more preferable, for typical implanted wireless devices. Other devices, such as electric cars, consumer devices, or internet-of-things (IoT) devices, will operate under different conditions than implanted devices, and different levels of return loss may be acceptable in their link budgets, but in general it is preferable for RL to be low.

Returning to FIG. 2, as the antenna impedance changes due to loading, the return loss RL will change, resulting in higher $P_r$ and hence lower $P_{avail}$. The lower $P_{avail}$, despite constant power provided at the radio frequency module 202, directly impacts the efficiency of the overall system 200 and results in communication performance deterioration, impacting link availability between emitter and receiver coils. Decreasing system performance is undesirable because it can lead to losses of information or signal transmission quality.

In FIG. 2, varactor 204 can be tuned, such as by a processor (not shown) to maintain a low level of overall impedance mismatch in the system. In FIG. 2, the varactor 204 is tuned to balance $Z_L$ and $Z_S$ in the circuit 200 for radio frequency signal transmitted from the radio frequency module 202. In other embodiments, the radio frequency module 202 could be replaced by some other emitting circuitry that operates at a different frequency, and it should be understood that while radio frequency is commonly used for wireless communication in implantable medical devices, any electromagnetic field frequency can be used by the appropriate receiver.

Impedances 206A and 206B can be static components of an LRC circuit, each having a set impedance level. By using a component with a variable impedance, varactor 204, the balance of $Z_L$ and $Z_S$ can be actively, or even autonomously, maintained.

Figure 4:
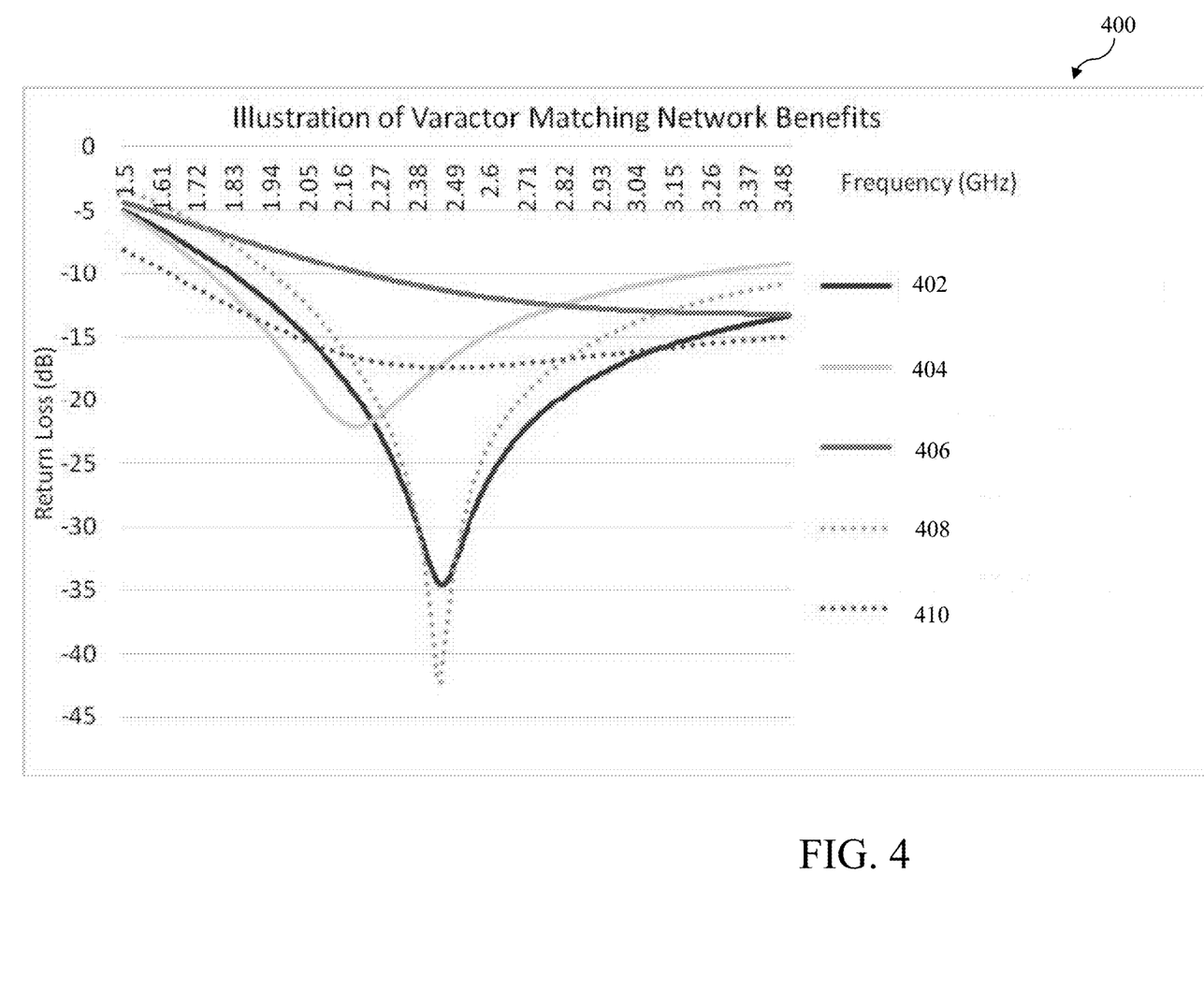
FIG. 4 is a chart of impedance mismatch levels of embodiments described herein, compared to un-tuned circuits.

FIG. 4 is a chart of return loss RL as a function of operating frequency, in particular showing the distinction between circuits that are balanced using a varactor in comparison to those that are not. As shown in chart 400, a device is configured to operate at between about 2.40 and about 2.48 GHz, such as the operating ranges described above with respect to Table 1. It is therefore preferable to have low return loss RL within this band. A baseline match 402 was established for a cranial implant. Line 404 is the corresponding baseline match as a function of frequency without using a varactor for impedance matching arranged in a buttock (in fat), and line 406 is the corresponding baseline match as a function of frequency without using a varactor for impedance matching (in muscle). Line 408 shows impedance as a function of frequency for the same arrangement as line 404, but using a varactor for impedance matching. Line 410 shows impedance as a function of frequency for the same arrangement as line 406, but using a varactor for impedance matching.

As shown by the difference between line 404 and line 408, as well as the difference between line 406 and line 410, the power lost to impedance mismatch at a desired frequency (here, about 2.48 GHz) can be minimized by the described embodiment. Using a varactor for impedance matching not only shifts the frequency of the minimum for a given implant arrangement, but also improves the return loss at that minimum.

Figure 5:
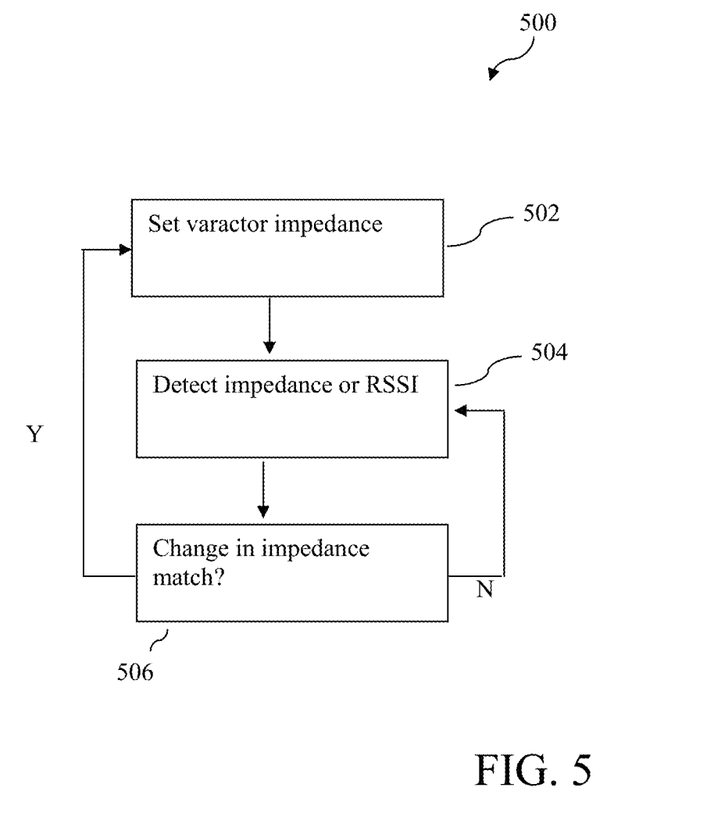
FIG. 5 is a flowchart of a method for operating a tunable circuit according to an embodiment.

FIG. 5 shows a flowchart of a method 500 for managing impedance in a system according to embodiments described herein. At 502, the impedance of the varactor can be set (see, e.g., FIG. 2). varactor values would be selected based off anticipated loading in certain implant locations based off modeling or other means of evaluation. Because some variation is expected between any given model and an actual implementation, small offsets may be present that could be accommodated by changes to the varactor setting. The requirement for a change (or amount of change) is based upon a detected impedance, at 504. If the detected impedance is not in accordance with the model 504, then as shown at 506 the varactor impedance is modified (following the "Y" line back to 502). On the other hand, if the varactor impedance still seems to be a good fit for the implementation, then the method 500 includes returning periodically (or continuously) to detecting impedance 504, following the "N" line.

The method 500 includes not only determining whether the impedance is in accordance with an initial model, but also whether the impedance should be updated throughout its lifetime. Movement of a wireless device, or environmental changes such as the growth of other tissues around a medical implant, could change the environment that the wireless receiver "sees" over time (see, e.g., FIG. 1). Impedance seen by an implanted device may shift from more fat like when first implanted to more muscle like over time, potentially due to fluid build up around the device. Modeling has shown how the impedance looks more like muscle when placed in the supra-muscular fat layer immediately next to the buttock muscle, but how as the implant moves farther away from the muscle in the fat layer the impedance looks more like fat. This has implications for patients with more subcutaneous or visceral fat, in whom an implanted device may be farther away from muscle than leaner patients. By using a varactor having settings that can be adaptively varied, these impacts can be mitigated.

To realize an adaptive algorithm for setting the varactor value, an input is necessary to evaluate the "goodness" of the current match, as shown at 504. In absence of mismatch indicators at the radio output terminals, one embodiment uses the radio's RSSI (receive signal strength indicator) in a feedback loop algorithm to update the programmed varactor settings according to the method 500.

In a variation on method 500, a medical device is implanted with initial varactor settings based on a known target implant location. After implant and during recurring follow-up visits, a telemetry optimization routine can be conducted in which the clinician/operator is instructed to place the programmer near the implant and remain still (do not move implant or programmer). The programmer instigates a continual transmission of a known command, and the radio then knows to start the tuning algorithm. The algorithm records the RSSI value as it steps through a predefined range of varactor values based off the implant location. Finally, the algorithm then selects the varactor setting which achieved the highest RSSI.

It should be understood that in alternative embodiments, the varactor could be replaced by a different component with tunable impedance. Varactors are particularly useful in this context, however, because they do not take up significant space within the device, and because they can be continuously variable. Thus, they can be tuned to the appropriate level on a continuum rather than set to a value with a granularity that may be too high to accomplish the desired effect. Use of a varactor facilitates smart and flexible impedance matching that is capable of changing over time to meet the needs of the overall circuit.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A tunable circuit for use in an implantable medical device, the tunable circuit comprising:
    a current generator configured to produce an alternating electrical current containing a signal at or above 13 MHz suitable for electronic communications;
    an antenna configured to receive the alternating electrical current and produce an alternating electromagnetic field representative of the signal and a level of ambient impedance;
    a plurality of fixed impedances arranged between the antenna and the current generator; and
    a variable impedance arranged in the same electrical circuit as the plurality of fixed impedances, the variable impedance capable of being operated to dynamically maintain a matching impedance based upon temporal changes in the level of ambient impedance, in combination with the plurality of fixed impedances,
    wherein the level of ambient impedance varies based upon a detected impedance, a received signal strength indicator, or another physical parameter of a material surrounding the implantable medical device.

2. The tunable circuit of claim 1, wherein the variable impedance is a varactor.

3. The tunable circuit of claim 1, further comprising a processor configured to maintain the matching impedance between the variable impedance and the plurality of fixed impedances.

4. The tunable circuit of claim 3, wherein the processor is configured to continuously update the matching impedance between the variable impedance and the plurality of fixed impedances.

5. The tunable circuit of claim 1, wherein the current generator is configured to operate at 2.4 GHz.

6. The tunable circuit of claim 1, wherein the tunable circuit is a component of an implanted medical device that is implanted at a depth, wherein the depth and an orientation of the implanted medical device are time-variant.

7. A method for wireless electronic communication with an implantable medical device, the method comprising:
    setting a varactor impedance in a tunable circuit of the implantable medical device, the tunable circuit including:
        a current generator configured to produce an alternating electrical current;
        an antenna configured to receive the alternating electrical current and produce an alternating electromagnetic field containing a signal at or above 13 MHz suitable for electronic communications;
        a plurality of fixed impedances arranged between the antenna and the current generator; and
        a variable impedance arranged in parallel with the plurality of fixed impedances and capable of being operated to maintain a matching impedance in combination with the plurality of fixed impedances;
    detecting a physical parameter corresponding to a level of impedance between the plurality of fixed impedances and the variable impedance, such as an impedance, a received signal strength indicator, and another physical parameter; and
    dynamically adjusting the variable impedance based upon the detected physical parameter.

8. The method of claim 7, wherein adjusting the variable impedance based upon the detected receive signal strength indicator causes a decrease in a return loss of the tunable circuit.

9. The method circuit of claim 7, wherein the variable impedance is a varactor.

10. The method of claim 7, the tunable circuit further comprising a processor configured to maintain the matching impedance between the variable impedance and the plurality of fixed impedances.

11. The method of claim 10, wherein the processor is configured to continuously update the matching impedance between the variable impedance and the plurality of fixed impedances.

12. The method of claim 7, wherein the current generator is configured to operate at 2.4 GHz.

13. The method of claim 7, wherein the tunable circuit is a component of an implanted medical device.

14. The method of claim 7, wherein dynamically adjusting the variable impedance comprises modifying a capacitance of the variable impedance.

\* \* \* \* \*